United States Patent [19]

Bloom

[11] Patent Number: 4,585,571

[45] Date of Patent: Apr. 29, 1986

[54] DEICING COMPOSITIONS

[75] Inventor: Stanley H. Bloom, Dallas, Tex.

[73] Assignee: Michael A. Bloom, Dallas, Tex.

[21] Appl. No.: 712,681

[22] Filed: Mar. 15, 1985

[51] Int. Cl.$^4$ .............................................. C09K 3/18
[52] U.S. Cl. .......................................... 252/70; 106/13;
252/118; 252/122; 252/132; 252/153; 252/171;
252/544; 252/548; 252/550; 252/554; 252/558
[58] Field of Search .................... 106/13; 252/70, 118,
252/122, 132, 153, 171, 544, 548, 550, 554, 558

[56] References Cited

U.S. PATENT DOCUMENTS

| | | | |
|---|---|---|---|
| 2,200,184 | 5/1940 | Morgan | 252/75 |
| 3,350,314 | 10/1967 | Dawtrey et al. | 252/70 |
| 3,412,030 | 11/1968 | Wahlberg | 252/70 |
| 3,537,900 | 11/1970 | Halbert | 134/42 |
| 4,254,166 | 3/1981 | Glanville et al. | 252/70 |
| 4,358,389 | 11/1982 | Konig-Lumer et al. | 252/70 |
| 4,388,203 | 6/1983 | Nimerick et al. | 252/70 |

FOREIGN PATENT DOCUMENTS

| | | | |
|---|---|---|---|
| 3142059 | 5/1983 | Fed. Rep. of Germany | |
| 3229654 | 2/1984 | Fed. Rep. of Germany | 252/70 |
| 35035 | 11/1975 | Japan | 106/13 |

OTHER PUBLICATIONS

A. Schwartz et al., 2 Surface Active Agents and Detergents, pp. 398–408, 729–730, (Interscience Pub., Inc., New York, 1958).

Primary Examiner—Paul Lieberman
Assistant Examiner—Robert A. Wax
Attorney, Agent, or Firm—Leydig, Voit & Mayer

[57] ABSTRACT

The invention provides for a deicing compositions for use on airplanes, runways, streets, and the like, which deicing composition comprises (a) an alkylene polyol, (b) an anionic surfactant capable of forming a hydrophobic monolayer on the metal surfaces of the aircraft, (c) a hydrophilic wetting agent which is capable of associating with the hydrophobic monolayer, and (d) a coupling agent, which facilitates the association between the wetting agent and monolayer.

7 Claims, No Drawings

DEICING COMPOSITIONS

SUMMARY OF THE INVENTION

This invention concerns a deicing composition for application to surfaces, particularly metallic and non-metallic surfaces of aircraft, which removes frozen water from the surface and prevents its reformation.

BACKGROUND OF THE INVENTION AND PRIOR ART

Weather conditions produce a variety of frozen precipitation: ice, snow, sleet, hail, frost, and slush. The problems created by such precipitation when it covers surfaces such as airplanes, runways, streets, roads, parking lots and sidewalks are well known. In general terms, the solution is simply to remove the ice and/or to prevent it from reforming or re-adhering to the surface.

The problems associated with ice formation on the surfaces of aircraft are particularly acute, both because the demands placed on a deicing composition are severe and because the consequences of ice formation can be catastrophic. Thus, this invention, although it may be applied to other systems, shall be discussed generally in the context of that most demanding system. Unless indicated otherwise, when this specification refers to ice it shall be understood that the term encompasses all forms of frozen water by whatever name they may be known.

The art seemingly is complete, and it evidences a number of strategies for preventing the formation and reformation of ice. The most obvious strategy is to depress the melting point of water by admixing, or by allowing the admixture of other materials. For example, in U.S. Pat. No. 2,200,184 to Morgan, it is disclosed that large proportions of alkanol amines effectively depress the freezing point of water into which it is added. Perhaps the most common antifreeze and deicing compositions, however, are based on ethylene glycol and other alkylene polyols.

German Pat. No. 3,142,059 to Schwenk discloses aircraft deicing fluids based on alkylene gylcols having 2 to 3 carbon atoms and oxalkylene glycols having 4 to 6 carbon atoms, and preferably on ethylene and propylene glycol. U.S. Pat. No. 4,358,389 to König-Lumer discloses very similar aircraft deicing fluids based on the same glycols, and cites and discusses other such patents, e.g., U.S. Pat. No. 2,373,727, German Pat. No. 1,901,061, and German Pat. No. 2,423,893.

Simply depressing the freezing point of water, however, does not provide a complete solution. Other strategies have been adopted. In an entirely different context, certain additives were utilized to enhance the effectiveness of ethylene glycol by reducing the mechanical strength of ice.

In U.S. Pat. No. 4,254,166 to Glanville, the problem addressed was the freezing of particulate material, such as coal, which may be moved and stored under subfreezing conditions. By adding certain highly soluble inorganic or organic compounds containing an ammonium ion, it was discovered that the mechanical strength of ice was greatly reduced. Glanville also disclosed that for economic reasons, it may be desirable to add various surface active agents, such as anionic surfactants, and particularly, non-ionic surfactants of the polyethoxylated type. Such compounds also reduce the mechanical strength of ice, presumably by interfering in some way with the crystalline structure.

Another study focuses on the thermal exchange properties of ice/water systems. In U.S. Pat. No. 3,412,030 to Wahlberg, a method for accelerating the melting of snow was disclosed. It consisted, in essence, of dissolving in situ anionic, non-ionic, or cationic wetting agents. A wide variety of wetting agents, including alkylaryl sulfonates, is disclosed as useful. It should be noted, however, that non-ionics, e.g., ethoxylated alcohols, tend to oxidize easily and are explosive.

Although Wahlberg acknowledged that it had not been fully determined, he suggested a partial explanation. By dissolving wetting agents therein, the water film formed upon initial thawing has a lower surface tension, and water more readily runs off the ice surface or into the snow. The thermal exchange between the ice and air is enhanced in two ways. Firstly, the ice is placed thereby in more direct contact with the surrounding air and/or warmer air is permitted to flow into the interior regions of the snow cover. Secondly, there is less water on the surface which might otherwise absorb surrounding heat, evaporate, and further cool remaining water and the ice surface.

Preventing the reformation of ice is a related, but in many ways, different problem. It is well known that surfactants may be used to create on aircraft a temporary or semipermanent surface coating having a low adhesion for ice. See A. Schwartz, et al., 2 SURFACE ACTIVE AGENTS AND DETERGENTS 398–408, 729–30 (Interscience Pub., Inc., New York 1958). Among the surfactants used for that purpose are the sorbitol esters of fatty acids, the lower alkylnapthalenesulfonates, and the silicones.

It also is known that among other water-soluble surfactants, alkylaryl sulfonates are useful as anti-fogging agents. The mechanism is similar: a water repellent film is laid down on the protected surface. Generally, those surfactants are used in glycol bases with spreading and antifreeze agents. Anionic sulfonates, when used in conjunction with polyglycol esters of fatty acids, are especially suited for plastic surfaces. Long-chain cationic surfactants also are known to lay down a water-repellent film on glass surfaces, even when applied via dissolution in an aqueous solution.

The demands on aircraft deicing fluids, however, are particularly acute. Their properties may be discussed as three general and related sets of properties: functional, compatibility, and application.

The functional requirements, in a sense, are the most obvious. The fluid must remove existing ice from the aircraft surface and prevent ice reformation for at least eight hours. Of course, they themselves must not freeze at the application temperatures.

The compatibility requirements are many, because the typical aircraft encompasses a variety of surfaces: aluminum, titanium, magnesium, alloys thereof, high-strength steel, glass, acrylic, paint, decals, and electrical connections. Deicing fluids should not leave deposits, corrode or embrittle metal, soften or bubble paint and decals, or craze acrylic. Their flash point should be sufficiently high so that the plane's electrical system does not ignite the fluid.

Not only must they be compatible with all aircraft surfaces, but their viscosity, specific gravity, stability and other flow and shear properties must allow for proper application by conventional spraying techniques. All surfaces should be covered. The fluid should sheet and remain on the surface long enough to deice and protect the aircraft, but excess quantities should not interfere with the aerodynamic qualities of the plane.

The properties of acceptable deicing fluids, and the testing procedures for determining those properties are outlined in Publications AMS 1425A and AMS 1427, revised/issued on Apr. 1, 1982, and Oct. 1, 1981, respectively, by The Society of Automotive Engineers, Inc., 400 Commonwealth Drive, Warrendale, Pa. 15096 (respectively, for ethylene glycol and propylene glycol based fluids). Those publications are herein incorporated by reference.

Despite the apparent completeness of the prior art in this field, to date the inventor herein is unaware of any fluid which is able to meet those specifications in their entirety. Generally, the prior art deicing fluids have had problems in maintaining long lasting protection against ice reformation without compromising the compatibility properties of the fluid. Specifically, ethylene glycol alone does an excellent job of removing existing ice and is entirely compatible with the aircraft. It does not provide protection against reicing, however, except in the very short term. Additives designed to provide long term protection against reicing generally compromise the fluid's compatibility, particularly in that decreased flash points, acrylic crazing, paint bubbling, and metal hydrogen embrittlement often are observed.

OBJECTS OF THE INVENTION

It is the object of this invention, therefore, to provide a deicing fluid which effectively removes existing ice and prevents its reformation for at least eight hours without adversely affecting the compatibility properties of the fluid. In particular, it is a further object to provide a fluid having effective and long lasting deicing protection which does not cause metal embrittlement or corrosion.

It is a further object of this invention to provide a deicing fluid which meets the AMS specifications referred to herein above.

SUMMARY OF THE INVENTION

This invention provides for a deicing fluid which comprises (a) an alkylene polyol, (b) an anionic surfactant capable of forming a hydrophobic monolayer on the metal surfaces of the aircraft, (c) a hydrophilic wetting agent which is capable of associating with the hydrophobic monolayer, and (d) a coupling agent, which facilitates the association between the wetting agent and monolayer.

Other objects of the invention will become apparent from the following detailed description of the invention.

DETAILED DESCRIPTION OF THE INVENTION

Alkylene Polyol

The alkylene polyol may be selected from the group comprising alkylene glycols having 2 to 3 carbon atoms, e.g., ethylene glycol and propylene glycol; dialkylene glycols having 2 to 3 carbon atoms, e.g., diethylene glycol and dipropylene glycol; oxalkylene glycols having 4 to 6 carbon atoms and mixtures thereof. The preferred alkylene polyols are ethylene glycol and propylene glycol. Propylene is especially preferred in that, unlike ethylene glycol, it does not burn readily and when it does, it does not produce toxic byproducts.

The alkylene polyol serves to depress the freezing point, and thereby is the principal agent for removing existing ice from aircraft surfaces. Indeed, ethylene glycol alone is an effective agent for that purpose.

The alkylene polyol may comprise from 75 to 99.99 vol % of the fluid, with the preferred amount being approximately 98.5%.

Anionic Surfactant

The anionic surfactant may be selected from unsaturated, saturated, or saturated and unsaturated fatty acid diamines having carbon chains from 4 to 40. Particularly useful are those fatty acid diamines derived from naturally-occurring fatty acids. Especially preferred are oleic acid diamine, palmitic acid diamine, and oleyl propylene diamine. The selection and use of these diamines should be guided by the desired functional and compatibility characteristics.

The anionic surfactant and wetting agent combine to prevent the reformation or re-adhering of ice to the surfaces. The theory has not been fully elucidated, but it is believed that the anionic surfactant creates a hydrophobic monolayer on the metallic surfaces.

The anionic surfactant must be compatible with all aircraft surfaces, however, such as rubber, acrylic, glass, etc., as well as the metallic surface to which it is intended to adhere. It also should adhere with sufficient strength so that under runway conditions the monolayer will remain substantially intact for extended periods, at least eight hours. Upon takeoff, however, it is desirable that the monolayer shear within a relatively short period, e.g., 15 minutes. Thus, the surfactant must not adhere too strongly or leave deposits.

Although the proportions will vary according to the choice made, in general the diamine should amount to no more than 1 vol. part in 7,500 of fluid. Above that level $H_2$ embrittlement of the metal surfaces will occur. The upper limit should be approached, however, because when lesser proportions are used, washing with greater quantities of fluid is required to establish the monolayer.

Hydrophilic Wetting Agent

The hydrophilic wetting agent may be selected from mono and polyalcohol amines. As the amine goes from mono, to di, to trialcohol, however, the flash point increases, and thus the polyalcohol amines will be preferred. It also is important to note that the hydrophilicity decreases as the number of carbon atoms in the alcohol increases. Thus, the preferred polyalcohol amine is triethanol amine.

It is believed that the wetting agent cooperates with the hydrophobic monolayer to prevent ice reformation or re-adhering. Although the hydrophobic monolayer alone can provide significant protection, it is still possible, particularly on substantially horizontal surfaces for ice to reform or re-adhere. The hydrophilic wetting agent, however, is capable of depressing the freezing point, and of lowering the surface tension of water. Thus, if the wetting agent is capable of associating with the monolayer, it will create a localized zone of antifreezing and wetting action.

It is believed that the creation of a hydrophobic monolayer and the overlaying wetting/antifreeze zone from compounds which are not in themsevles, or in the quantities used, corrosive or otherwise incompatible with the aircraft surfaces, is the explanation for the surprising success of the subject composition. In effect, a highly viscous film of water is formed by the action of the wetting/antifreeze zone on the already slippery monolayer. That prevents the freezing of atmospheric water vapor on the surfaces, and enables falling ice, which otherwise might adhere, to slide easily off even substantially horizontal surfaces.

It should be noted that the degree of association is important. If the association with the monolayer is too great, the wetting agent will not attract water and the wetting and freezing point depression effects will be lost. Similarly, if the association is weak; the wetting agent will run off upon application, and the antifreeze zone will not be created.

In general, the wetting agent should be used in equal parts to the anionic surfactant. The amount should not exceed 1 vol. part in 7,500 of the fluids, however, as larger quantities cause rippling and crazing of acrylic windshields.

Hydrophilic Coupling Agent:

The coupling agent may be selected from any of the wide variety of anionic hydrophiles which are soluble in polar solvents, specifically, water and the alkylene polyol. Such agents include soaps, sulfated soaps, sulfated amides, sulfated alcohols, sulfated ethers, sulfated carboxylic acids, petroleum sulfonates, sulfonated aromatic hydrocarbons, sulfonated aliphatic hydrocarbons, sulfonated aromatic-aliphatic hydrocarbons, sulfonated amides, sulfonated ethers, acylated amino acids, and acylated polypetides. Representative examples include sodium N-alkylcarboxy sulfosuccinate, sodium alkylsulfosuccinate, polyalkanolamine-fatty acid condensate, sodium alkylbiphenyl sulfonate, and sodium alkyl-napththalene sulfonate. Especially preferred coupling agents are sodium dodecylbenzene disulfonate, sodium lauryl sulfate and sodium dodecylbenzene sulfonate. The selection of the coupling agent should in all cases be guided as well by the compatibility and application requirements. For example, the metal alkyl phosphates are anionic hydrophiles, but they are known to cause embrittlement of the metal surfaces.

The association of the hydrophilic wetting agent is enhanced by a hydrophilic coupling agent. Again, the theory has not been determined fully, but it is believed that the coupling agent operates to aid in the creation of the highly localized, wetting/antifreeze zone adjacent to the hydrophobic monolayer. It also should be possible, however, to select an appropriate wetting agent which is capable of creating the wetting/antifreeze zone without the addition of a coupling agent. When added in relatively large quantities, this coupling agent also may enhance the application properties of the deicing fluid.

The precise amount of coupling agent will vary according to the particular choice, but in general, they may be used in amounts ranging from 0.01 to 25 vol % of the fluid. Above 5–10 vol %, depending on temperature and the particular coupling agent, foaming will occur, and that may be a problem. Below 0.075 vol % the coupling agent generally would not be expected to improve the application properties of the diluted deicing fluid. Thus, a preferred range would be 0.075 to 5.0 vol % of the fluid. It had been found that for the preferred coupling agent, the preferred proportion is approximately 1.5 vol % of the fluid.

Making and Using the Invention

The deicing fluid of this invention may be prepared by mixing the individual components together in any desired sequence. The individual components themselves are readily synthesized by known methods and are commercially available. The deicing fluid of this invention also may be used with conventional additives, such as dyes, corrosion inhibitors, and thickeners, if desired, so long as they are compatible with the aircraft surfaces.

The deicing fluid of this invention may be used by spraying with conventional equipment onto the surfaces to be treated. It may be diluted as low as 1:15 with hot or cold water as desired. Although it is non-toxic, unless swallowed or inhaled, users should wear chemical glasses, aspirators, and rubber gloves and boots as precautionary measures.

The invention is further described by reference to the following Example. It is not intended to limit the scope of the invention; rather, it is presented merely to facilitate the practice of the invention by those of ordinary skill in the art and to further disclose the inventor's best mode of doing so.

EXAMPLE 1

A deicing fluid was prepared by admixing the following components in the specified proportions:

| | |
|---|---|
| alkylene polyol | ethylene glycol - 1 liter |
| anionic surfactant | oleyl propylene diamine - 2 drops (1 drop = 1/15 ml) |
| wetting agent | triethanol amine - 2 drops |
| coupling agent | sodium dodecyloxydibenzene disufonate - 5 ml |

The oleyl propylene diamine was obtained from Akzo Chemie America, Armak Chemical Division, 300 South Wacker Drive, Chicago, Ill. 60606, from whom it is marketed under the trademark DUOMINE-O. Although oleyl propylene diamine obtained from other manufacturers provided satisfactory results, the DUOMINE-O, for unknown reasons, gave superior performance.

The deicing fluid was subjected to a variety of tests to determine whether it conformed to the requirements set out in the publication AMS 1425A. Those tests are referred to by the ASTM and ARS publications which outline their procedures and standards. The ASTM publications are available from the American Society for Testing and Materials, 1916 Race Street, Philadelphia, Pa. 19103, and are incorporated by reference as they are identified in the tests which follows The ARS (Aerospace Recommended Practices) publications are available from the Society of Automotive Engineers, Inc., whose address is given above. These publications also are incorporated by reference.

Flash Point: AMS 1524A, 3.2.1.1

The flash point shall not be lower than 100° C., determined in accordance with ASTM D56 (Flash Point by Tag Closed Tester), ASTM D93 (Flash Point by Penske-Martens Closed Tester), or ASTM D3278 (Flash Point of Liquids by Setaflash Closed Tester). In case of dispute, the flash point determined according to ASTM D56 shall apply.

The fluid was tested according to those standards and was found to conform.

Specific Gravity: AMS 1425A, 3.2.1.2

The specific gravity of the fluid shall be within ±0.015 of the preproduction value established according to AMS 1425A, 4.4.1, as determined by ASTM D891 (Specific Gravity of Industrial Aromatic Hydrocarbons and Related Materials).

The fluid was tested according to those standards and was found to conform.

Storage Stability: AMS 1425A, 3.2.1.3

The fluid, tested in accordance with ASTM F503 (Preparing Aircraft Cleaning Compounds, Liquid Type, for Storage Stability Testing), shall neither show separation from exposure to heat or cold nor show an increase in turbidity greater than a control sample equally diluted 1:1 with distilled water.

Preliminary results indicate that the fluid conforms to those standards.

pH: ASM 1425A, 3.2.2.1

The pH of the fluid and a 1:1 dilution with distilled water shall be within ±0.5 the preproduction value established in ASM 1425A, 4.4.1 for the concentrate, as determined by ASTM E70 (pH of Aqueous Solutions with the Glass Electrode).

The fluid and dilution were treated according to those standards and were found to conform (conc.—8.2; dilution—8.0).

Pour Point: ASM 1425A, 3.2.2.2

The pour point of the fluid and a 1:1 dilution with distilled water shall not be greater than +5° C. (+10° F.) from the preproduction value established in ASM 1425A, 4.4.1 as determined by ASTM D97 (Pour Point of Petroleum Oils).

The fluid and the dilution were tested according to those standards and were found to conform.

Viscosity: ASM 1425A, 3.2.2.3

The viscosity of the fluid and a 1:1 dilution with distilled water shall be within ±5% of the preproduction value established in ASM 1425A, 4.4.1 at −10° C. (14° F.), at 0° C. (32° F.), and 50° C. (122° F.) as determined by ASTM D445 (Kinematic Viscosity of Transparent and Opaque Liquids (and the Calculation of Dynamic Viscosity)).

The fluid and dilution were tested according to those standards and were found to conform.

Sandwich Corrosion: ASM 1425A, 3.2.2.4.1

Metal specimens, when exposed to the fluid and a 1:1 dilution with distilled water and tested in accordance with ARP 1512, shall not show a rating worse than 2.

The fluid and dilution were tested according to those standards and were found to conform; the rating of all specimens in both the fluid and dilution being 1.

Total Immersion Corrosion: ASM 1425A, 3.2.2.4.2

Metal specimens, when exposed to the fluid and a 1:1 dilution with distilled water and tested in accordance with ASTM F483 (Total Immersion Corrosion Test for Aircraft Maintenance Materials), shall not show evidence of corrosion or cause a weight change of any single specimen greater than those values set out in Table I below.

The fluid and dilution were tested according to those standards and as indicated by the data reported in Table I below, were found to conform.

TABLE I

| Specimen | Maximum Weight change $(mg/cm^2)$/ 24 hr | Experimental Data Conc. | Diluted |
|---|---|---|---|
| AMS 4037 or QQ-A-250/4 Aluminum Alloy, anodized as in AMS 2470 | 0.30 | 0.20 | 0.20 |
| AMS 4041 or QQ-A-250/5 Aluminum Alloy Optional | 0.30 | 0.24 | 0.20 |
| AMS 4049 or QQ-A-250/13 Aluminum Alloy | 0.30 | 0.21 | 0.20 |
| AMS 4376 or QQ-M)44 Alloy AZ31B Magnesium Alloy, dichromate treated as in AMS 2475 | 0.20 | 2.20 | 0.19 |
| AMS 4911 or Mil-T-9046, Type III, Composition C, Titanium Alloy | 0.10 | 0.07 | 0.02 |
| ASTM A109, Temper No. 1, or QQ-S-698, Condition 1, Carbon Steel | 0.80 | 0.06 | 0.40 |

Low-Embrittling Cadium Plate: ASM 1425A, 3.2.2.4.3

Specimens coated with low-embrittling cadmium plate, when exposed to the fluid and a 1:1 dilution with distilled water and tested in accordance with ARP 1511, shall not experience a weight change greater than 0.3 $(mg/cm^2)$/24 hrs.

The fluid and dilution were tested according to those standards and were found to conform, the weight loss associated with each being 0.16 and 0.18 $(mg/cm^2)$/hrs, respectively.

Stress-Corrosion Resistance: ASM 1425A, 3.2.2.4.4

The fluid and a 1:1 dilution with distilled water shall not cause cracks in AMS 4911 titanium alloy, as determined in accordance with ASTM G30 (Making and Using U-Bend Stress Corrosion Test Specimens) using U-Bend specimens according to Example 1 of ASTM G30. The 3-in. (75-mm) dimensions of the specimens shall be parallel to the direction of rolling (longitudinal). The specimens shall be stressed in two steps. First stage stressing shall be by brake forming over a 0.28 in. (7.0 mm) mandrel in one pass to 65±5 deg. Six test specimens shall be exposed to the test fluid: three to diluted fluid and three to concentrated fluid. Specimens shall be immersed in the test fluid, withdrawn, air dried, heated for 8±0.25 hr at 425°±5° C. (800°±9° F.), cooled at room temperature, and examined at 20× magnification for cracks. Two control specimens shall be similarly tested without exposure to test fluid.

The fluid and dilution were tested according to those standards and were found to conform.

Hydrogen Embrittlement: ASM 1425A, 3.2.2.5

The fluid and a 1:1 dilution with distilled water shall be non-embrittling, as determined in accordance with ASTM F519 (Hydrogen Embrittlement Testing of Aerospace Materials) Type 1a, 1c, or 2a.

The fluid and dilution were tested according to those standards and were found to conform.

Effect on Transparent Plastic: ASM 1425A, 3.2.2.6

The fluid and a 1:1 dilution with distilled water, heated to 65°±5° C. (150°±10° F.), shall not craze, stain, or discolor Mil-P-25690 stretched acrylic plastic, as determined in accordance with ASTM F484 (Stress Crazing of Acrylic Plastics in Contact with Liquid and Semi-Liquid Compounds).

The fluid and dilution were tested according to those standards and were found to conform.

Effect on Painted Surfaces: ASM 1425A, 3.2.2.7

The fluid and a 1:1 dilution with distilled water when heated to 65°±5° C. (150°±10° F.), shall neither decrease the paint film hardness by more than two pencil hardness levels nor shall it produce any streaking, discoloration, or blistering of the paint film, as determined in accordance with ASTM F502 (Effects of Cleaning and Chemical Maintenance Materials on Painted Aircraft Surfaces).

The fluid and dilution were tested according to those standards and were found to conform.

Effect on Unpainted Surfaces: ASM 1425A, 3.2.2.8

The fluid and a 1:1 dilution with distilled water, when tested in accordance with ASTM F485 (Effects of Cleaners on Unpainted Aircraft Surfaces), shall neither produce streaking nor leave any stains requiring polishing to remove.

The fluid and dilution were tested according to those standards and were found to conform.

Rheological Properties: ASM 1425A, 3.2.2.9

There is no established standard for rheological properties. For general applicability, the fluid shall exhibit, as determined in accordance with ASTM D2196 (Rheological Properties of Non-Newtonian Materials), a non-Newtonian flow behavior over the temperature range 0°–20° C. (32°–68° F.) so that the fluid can be classified as a pseudoplastic fluid over that temperature range.

The fluid was tested according to those standards and did not conform. It did not decrease in viscosity with increasing shear rates. When subjected to a constant shear rate, the viscosity did not change noticeably.

When the aircraft will not be used predominantly north of the 68° North Parallel nor south of the 68° South Parallel, however, those standards do not have to be met by conventional deicing fluids. The reason is that such properties, by decreasing the run off time of the alkylene polyol, increase the time during which the surfaces will be protected against deicing. Outside those zones the demands on the fluid are not as severe.

It is believed that the rheological properties of the subject deicing fluid could be made to exhibit non-Newtonian behavior by the addition of small quantities of a thickening agent, e.g., 1 drop of castor oil per liter of fluid. Because it is believed the subject deicing fluid as presently composed provides long lasting protection against reicing under the most adverse conditions, however, the fact that it does not exhibit non-Newtonian behavior is not considered critical.

Performance: ASM 1524A, 3.2.3

The fluid, when used in accordance with manufacturer's recommendations, shall remove normally accumulated frozen deposits of frost and ice from the exterior surface of parked aircraft and shall provide protection against refreezing for up to 8 hours.

An aluminum sheet was coated with several milimeters of ice, and arranged at a 45° angle to the horizon. The deicing fluid was applied under 0° F. conditions, which conditions were maintained during the test. The results demonstrated that the fluid will remove ice and prevent its reformation for at least eight hours.

Quality: ASM 1425A, 3.3

The fluid shall be homogenous, uniform in color, and free from skins, lumps, and foreign materials detrimental to usage of the fluid.

The fluid has been tested and found to conform to those standards.

I claim:

1. A deicing composition which comprises
(a) from 75–99.99 volume % of an alkylene polyol selected from the group consisting of alkylene glycols having 2 to 3 carbon atoms, dialkylene glycols having 2 to 3 carbon atoms, oxyalkylene glycols having 4 to 6 carbon atoms, and mixtures thereof;
(b) from greater than zero to less than 1 in 7,500 volume parts of the fluid of an anionic surfactant which forms a hydrophobic monolayer on metallic surfaces selected from the group consisting of saturated and unstaturated fatty acid diamines having carbon chains from 4 to 40 and mixtures thereof;
(c) from greater than zero to less than 1 in 7,500 volume parts of the fluid of a hydrophilic wetting agent which associates with the hydrophobic monolayer selected from the group consisting of mono and polyalcohol amines; and
(d) from 0.01–25 volume % of the fluid of a coupling agent which associates with the hydrophobic monolayer and the hydrophilic wetting agent (c) selected from the group consisting of soaps, sulfated soaps, sulfated amides, sulfated alcohols, sulfated ethers, sulfated carboxylic acids, petroleum sulfonates, sulfonated aromatic hydrocarbons, sulfonated aliphatic hydrocarbons, sulfonated aromatic-aliphatic hydrocarbons, sulfonated amides, sulfonated ethers, acylated amino acids and acylated polypeptides.

2. The deicing composition of claim 1, wherein
(a) the alkylene polyol is selected from the group consisting of ethylene glycol and propylene glycol;
(b) the anionic surfactant is selected from the group consisting of fatty acid diamines derived from naturally-occurring fatty acids;
(c) the hydrophilic wetting agent is selected from the group consisting of diethanol amine and triethanol amine; and
(d) the coupling agent is selected from the group consisting of dodecylbenzene disulfonate, sodium lauryl sulfate and sodium dodecylbenzene sulfonate.

3. The deicing composition of claim 2, wherein
(a) the alkylene polyol is ethylene glycol;
(b) the anionic surfactant is selected from the group consisting of oleic acid diamine, palmitic acid diamine, and oleyl propylene diamine;
(c) the hydrophilic wetting agent is triethanol amine; and
(d) the coupling agent is sodium dodecyloxydibenzene disulfonate.

4. The deicing composition of claim 3, wherein
(b) the anionic surfactant is oleyl propylene diamine.

5. The deicing composition of any of claims 1, 2, 3 or 4,
(c) the hydrophilic wetting agent comprises a proportion of the fluid equal to that of the anionic surfactant; and
(d) the coupling agent comprises 0.075–5.0 vol. % of the fluid.

6. The deicing composition of claim 4, wherein (a) the alkylene polyol comprises 15,000 vol. parts of the fluid;

(b) the anionic surfactant comprises 2 vol. parts of the fluid;

(c) the hydrophilic wetting agent comprises 2 vol. parts of the fluid; and (d) the coupling agent comprises 75 vol. parts of the fluid.

7. A method for deicing surfaces of aircraft, runways, streets, roads, parking lots and sidewalks which comprises applying to the surface to be deiced the composition of any one of claims 1, 2, 3, 4, 5, or 6.

* * * * *

UNITED STATES PATENT AND TRADEMARK OFFICE
CERTIFICATE OF CORRECTION

PATENT NO. :  4,585,571
DATED      :  April 29, 1986
INVENTOR(S):  Stanley H. Bloom It is certified that error appears in the above-identified patent and that said Letters Patent is hereby corrected as shown below:

Column 8, Table I; line 14, Col. "Conc" change 2.20 to 0.20.

Signed and Sealed this

Fourteenth Day of October, 1986

[SEAL]

Attest:

DONALD J. QUIGG

*Attesting Officer*　　　*Commissioner of Patents and Trademarks*